(12) United States Patent
Tsukagoshi et al.

(10) Patent No.: US 7,274,497 B2
(45) Date of Patent: Sep. 25, 2007

(54) HOLOGRAPHIC RECORDING MEDIUM, METHOD FOR ADDING ADDRESS INFORMATION TO SAME, AND METHOD OF ADDRESSING

(75) Inventors: Takuya Tsukagoshi, Sagamihara (JP); Jiro Yoshinari, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 10/562,828

(22) PCT Filed: Jun. 3, 2004

(86) PCT No.: PCT/JP2004/007693

§ 371 (c)(1),
(2), (4) Date: Dec. 29, 2005

(87) PCT Pub. No.: WO2005/006317

PCT Pub. Date: Jan. 20, 2005

(65) Prior Publication Data

US 2007/0008598 A1    Jan. 11, 2007

(30) Foreign Application Priority Data

Jul. 14, 2003  (JP) .............................. 2003-196278

(51) Int. Cl.
    *G03H 1/26* (2006.01)
(52) U.S. Cl. .............................. 359/22; 359/21; 359/3; 359/900

(58) Field of Classification Search ...................... None
See application file for complete search history.

(56) References Cited

U.S. PATENT DOCUMENTS 6,064,586 A * 5/2000 Snyder et al. .............. 365/125

FOREIGN PATENT DOCUMENTS

| JP | A 10-097792 | 4/1998 |
| JP | A 11-509954 | 8/1999 |
| JP | A 11-311936 | 11/1999 |
| JP | A 2002-251745 | 9/2002 |

* cited by examiner

*Primary Examiner*—Fayez G. Assaf
(74) *Attorney, Agent, or Firm*—Oliff & Berridge, PLC

(57) ABSTRACT

Provided are a holographic recording medium, a method for adding address information to the holographic recording medium, and a method for addressing that can identify two-dimensional information pages by a simple addressing operation. In the holographic recording medium 12, two-dimensional information pages 40A, . . . each comprising multiple pixels are multiplexed and holographically recorded. A plurality of pixels in each of the two-dimensional information pages 40A, . . . form address pixels, and a set of the address pixels form an address information region 42A, . . . . The address information region 42A, . . . is disposed at a different position in the two-dimensional information page 40A, . . . on a two-dimensional information page basis or on a page group basis comprising a plurality of two-dimensional information pages.

27 Claims, 14 Drawing Sheets

HOLOGRAPHIC RECORDING MEDIUM, METHOD FOR ADDING ADDRESS INFORMATION TO SAME, AND METHOD OF ADDRESSING

TECHNICAL FIELD

The present invention relates to a holographic recording medium, a method for adding address information to the holographic recording medium, and a method of addressing that are used to record and reproduce information by utilizing holography.

BACKGROUND ART

In holographic recording that uses holography to record information into a recording medium, a laser beam from, for example, a laser diode is split into an object beam and a reference beam, and information is recorded into a holographic recording medium by an interference pattern formed by the reference beam and an information beam obtained by modulating the object beam.

When reproducing the recorded information, the reference beam is irradiated to the holographic recording medium, whereby the information is reproduced by the diffraction from the interference pattern.

As one of the above-described holographic recording media, there is a holographic recording medium described in, for example, Japanese Patent Laid-Open Publication No. 2002-251745, in which two-dimensional information pages used for recording two-dimensional patterns based on the information to be recorded, each capable of holographic recording and comprising multiple pixels, are provided in multiplexed form.

To address the above-described two-dimensional information pages in which two-dimensional patterns are recorded, in the information recording medium described in Japanese Patent Laid-Open Publication No. 2002-251745, address information that is holographic information is recorded at a specific site in each of the two-dimensional information pages.

In the optical information recording medium described in Japanese Patent Laid-Open Publication No. Hei 11-911936, address information is recorded on a reflective surface of the reflective substrate outside the hologram layer.

When address information is recorded in a hologram layer as described in Japanese Patent Laid-Open Publication No. 2002-251745, there is the problem that the addressing operation becomes complicated.

When address information is recorded outside a hologram layer as described in Japanese Patent Laid-Open Publication No. Hei 11-311936, there is the problem that a positional error between the hologram and address information tends to occur.

DISCLOSURE OF THE INVENTION

The present invention addresses the above-described problems in the conventional technology, with an object of providing a holographic recording medium, a method for adding address information to the holographic recording medium, and a method for addressing that can easily identify two-dimensional information pages by disposing the address information in each of the two-dimensional information pages so as to be detected by a simple addressing operation.

As a result of diligent research, the present inventor has found that if an address information region is provided at a different position in the page on a two-dimensional information page basis or on a page group basis comprising a plurality of two-dimensional information pages, it is possible to identify the two-dimensional information pages from the position of the address information region by a simple addressing operation.

In summary, the above-described objectives are achieved by the following aspects of the present invention.

(1) A holographic recording medium in which two-dimensional information pages each having multiple pixels are multiplexed and holographically recorded, wherein: address pixel and data pixel signals are recorded in each of the two-dimensional information pages; a plurality of pixels in the two-dimensional information page form the address pixels, and a set of the address pixels forms an address information region; the address information region is disposed at a different position in the two-dimensional information page on a two-dimensional information page basis or on a page group basis comprising a plurality of two-dimensional information pages; and the pixels outside the address information region disposed in the two-dimensional information page form a data region in which two-dimensional information is recorded as the data pixels.

(2) The holographic recording medium according to (1), wherein the set of the address pixels and a set of pixels similar to the set of the address pixels in the data region differ from each other in at least either on-pixel ratio or on-pixel arrangement.

(3) The holographic recording medium according to (2), wherein the address information region differs from the data region in on-pixel ratio.

(4) The holographic recording medium according to (3), wherein the on-pixel ratio of the data region is set to 50%, and the on-pixel ratio of the address information region is set to less than or more than 50%.

5. The holographic recording medium according to (3) or (4), wherein the address information region comprises a pixel block including a set of at least nine address pixels, and all the address pixels in the pixel block are set to on or off state.

(6) The holographic recording medium according to any one of (1) to (4), wherein the address information regions are disposed at an identical position in an identical page group, and each of the address information regions in the identical page group has a different on or off pixel arrangement in each of the two-dimensional information pages.

(7) A method for adding address information to a holographic recording medium capable of recording by interference between reference and information beams, wherein, when recording two-dimensional information pages each comprising multiple pixels into the holographic recording medium, an address information region comprising a set of address pixels formed by a plurality of pixels is formed at a different position in the two-dimensional information page on a two-dimensional page basis or on a page group basis comprising a plurality of two-dimensional information pages, and two-dimensional information is given to a data region comprising pixels outside the address information region disposed in the two-dimensional information page to perform holographic recording.

(8) The method for adding address information to a holographic recording medium according to (7), wherein address information is holographically recorded such that the set of address pixels and a set of pixels similar to the set of address pixels in the data region differ from each other in at least either on-pixel ratio or on-pixel arrangement.

(9) The method for adding address information to a holographic recording medium according to (8), wherein the on-pixel ratio of the data region is set to 50%, and the on-pixel ratio of the address information region is set to less than or more than 50%.

(10) The method for adding address information to a holographic recording medium according to (8) or (9), wherein the address information region comprises address pixels, and all the address pixels are set as on or off pixels.

(11) The method for adding address information to a holographic recording medium according to any one of (7) to (10), wherein the address information regions are disposed at an identical position in an identical page group, and the address information regions in the identical page group have different on-pixel arrangements on a two-dimensional information page basis.

(12) The method for adding address information to a holographic recording medium according to any one of (7) to (11), wherein the address pixel and the data pixel forming each of the two-dimensional information pages are displayed by pixels in a spatial light modulator disposed on an optical path of the information beam.

(13) A method for addressing a holographic recording medium in which: two-dimensional information pages each comprising multiple pixels are multiplexed and holographically recorded by using interference between reference and information beams; an address information region comprising a set of address pixels formed by a plurality of pixels selected from among the pixels and a data region comprising the remaining pixels and capable of recording two-dimensional information are provided in each of the two-dimensional information pages; and the address information region is disposed at a different position in the two-dimensional information page on a two-dimensional information page basis or on a page group basis comprising a plurality of two-dimensional information pages, wherein a target two-dimensional information page is detected by an amount of light from the address information region among diffraction light generated by irradiating a reference or search beam to the holographic recording medium.

(14) The method for addressing a holographic recording medium according to (13), wherein the data region is recorded with an on-pixel ratio of 50%, the address information region is recoded with an on-pixel ratio of less than or more than 50%, and the address information region is detected by a difference between the amounts of the diffraction light in the data region and the address information region.

(15) The method for addressing a holographic recording medium according to (13) or (14), wherein the reference or search beam is concentrated within the range of the address information region in a target two-dimensional information page, and sequentially illuminates each two-dimensional information page, thereby detecting the target two-dimensional information page by the diffraction light generated when the region illuminated by the reference or search beam matches the address information region.

(16) The method for addressing a holographic recording medium according to any one of (13) to (15), wherein the address information regions are recorded in a form of on-pixel arrangements that differ from one another on a two-dimensional information page basis or on a two-dimensional information page basis in an identical page group, and a target two-dimensional information page is detected according to the on-pixel arrangement after the position of the address information region in the two-dimensional information page has been detected.

(17) A holographic recording and reproducing apparatus for reproducing two-dimensional information in a holographic recording medium in which: two-dimensional information pages each comprising multiple pixels are multiplexed and holographically recorded; address and data pixel signals are recorded in each of the two-dimensional information pages; a plurality of pixels in the two-dimensional information page form the address pixels, and a set of the address pixels forms an address information region; the address information region is disposed at a different position in the two-dimensional information page on a two-dimensional information page basis or on a page group basis comprising a plurality of two-dimensional information pages; and pixels outside the address information region disposed in the two-dimensional information page form a data region in which the two-dimensional information is recorded as the data pixels, the holographic recording and reproducing apparatus comprising: a reference optical system for splitting a laser beam by using a beam splitter into an object beam and a reference beam and irradiating the reference beam to the holographic recording medium; a search optical system for irradiating the object beam as a search beam to the holographic recording medium; a spatial light modulator provided in an optical path of the search optical system and modulating the object beam to the search beam so as to sequentially illuminate each two-dimensional page; a light detector for receiving diffraction light generated from the holographic recording medium by the illumination of the search beam; and a control unit for detecting a target two-dimensional information page by an output of the light detector, wherein the spatial light modulator comprises multiple pixels capable of describing the two-dimensional information page, and narrows down the object beam to a range corresponding to the pixels of the address information region to modulate to the search beam.

(18) The holographic recording and reproducing apparatus according to (17), wherein the address information regions in the two-dimensional information pages recorded in the holographic recording medium are recorded in a form of on-pixel ratios that differ from one another on a two-dimensional information page basis or on a two-dimensional information page basis in an identical page group, and the control unit detects the on-pixel ratio of an address information region from the output of the light detector obtained when the address information region matches the search beam region in the spatial light modulator, thereby detecting a target two-dimensional information page.

BEST MODE FOR CARRYING OUT THE INVENTION

Exemplary embodiments of the present invention will now be described in detail with reference to the attached drawings.

Figure 1:
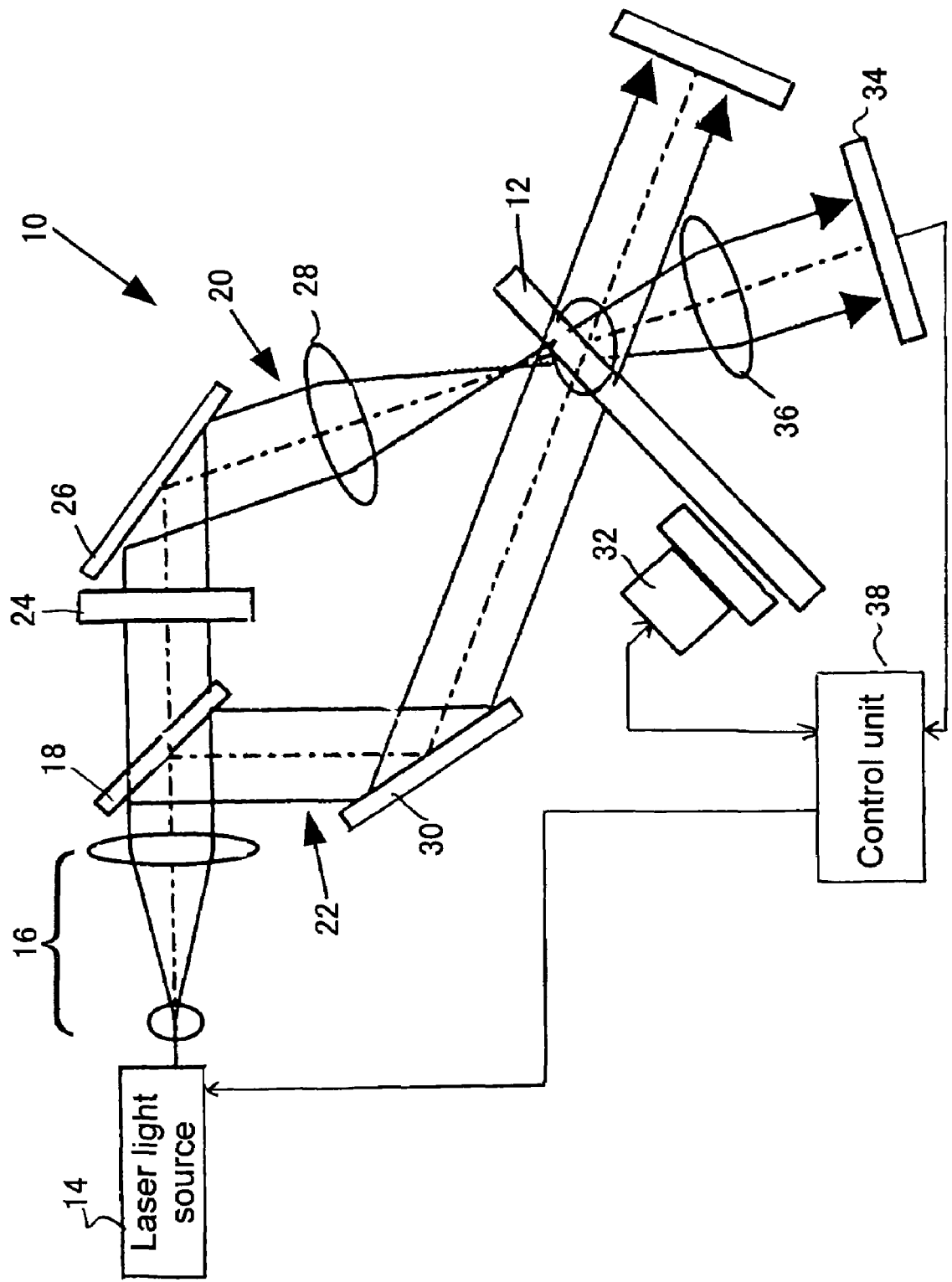
FIG. 1 is an optical layout diagram including part of a block diagram, illustrating a holographic recording and reproducing apparatus using the holographic recording medium according to an exemplary embodiment of the present invention.

Referring to FIG. 1, a holographic recording and reproducing apparatus 10 including a holographic recording medium 12 according to an exemplary embodiment of the invention comprises: a laser light source 14 such as a laser diode or other device; a beam expander 16 for expanding the diameter of the laser beam from the laser light source 14; a beam splitter 18 for splitting the laser beam collimated by the beam expander 16 into an object beam and a reference beam; and an object optical system 20 for guiding the object beam split by the beam splitter 18 to the holographic recording medium 12, and a reference optical system 22 for guiding the reference beam to the holographic recording medium 12.

The object optical system 20 comprises a spatial light modulator (SLM) 24, a mirror 26, and a Fourier lens 28 disposed in this order from the beam splitter 18 side. The reference optical system 22 has a mirror 30 disposed in its optical path.

The SLM 24 adds two-dimensional information to the object beam having passed through the beam splitter 18 to generate an information beam, and comprises, for example, transmissive liquid crystal cells.

In FIG. 1, the reference numeral 32 denotes a position controller for controlling the position of the holographic recording medium 12 with respect to the reference and object beams. The reference numeral 34 denotes a CCD for reproducing two-dimensional page information from the hologram formed by the reference beam and/or information beam. The reference numeral 36 denotes a Fourier lens disposed between the holographic recording medium 12 and the CCD 34. The reference numeral 38 denotes a control unit that receives the output signal from the CCD and controls the laser light source 14 and the position controller 32.

The holographic recording medium 12 is formed so that two-dimensional information pages can be holographically recorded in multiplexed form.

Figure 2:
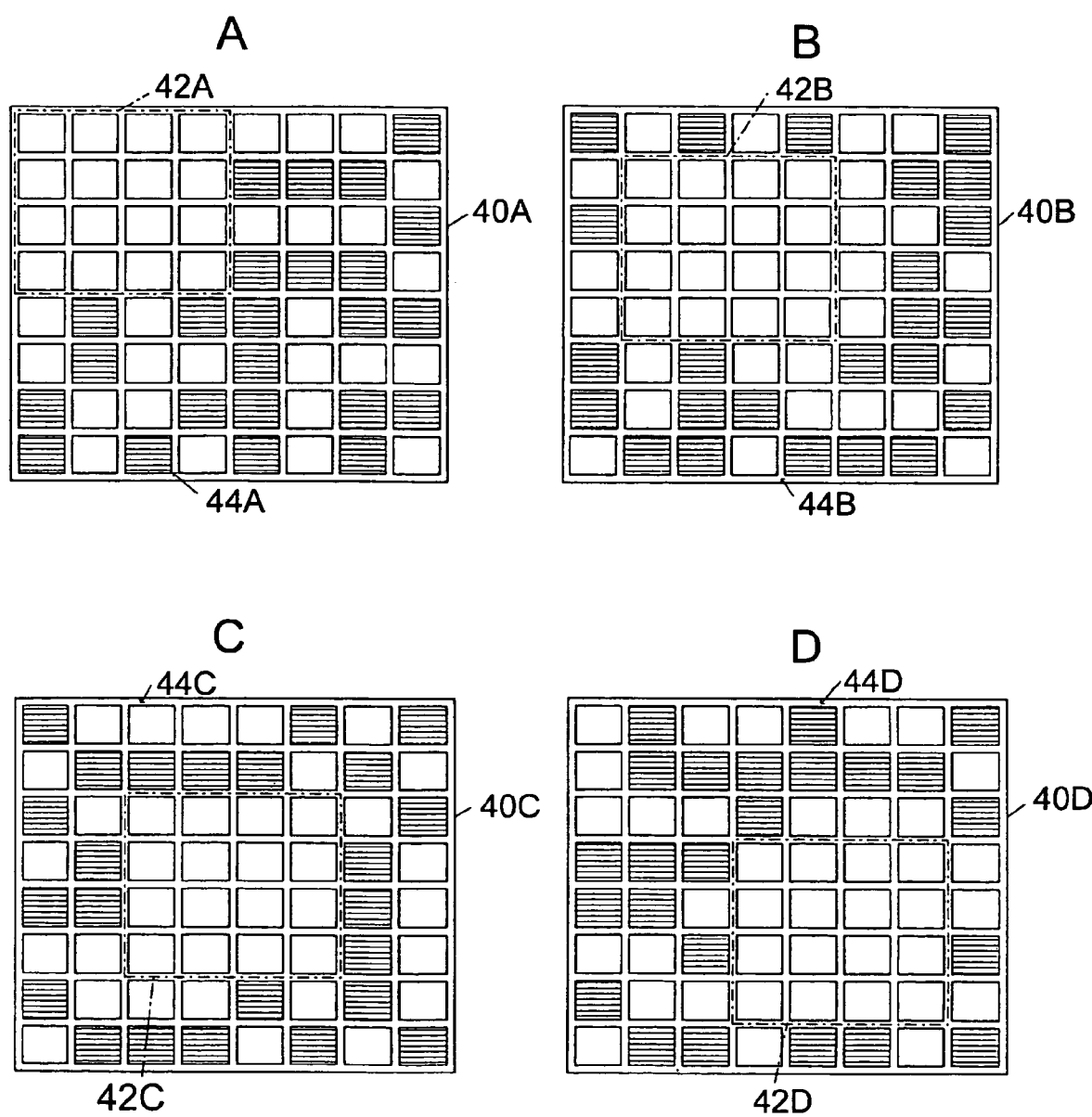
FIG. 2A is a map illustrating both an address information region and a data region in a two-dimensional information page recorded and reproduced in the holographic recording medium in FIG. 1.
FIG. 2B is a map illustrating another two-dimensional information page.
FIG. 2C is a map illustrating still another two-dimensional information page.
FIG. 2D is a map illustrating still another two-dimensional information page.

The SLM 24 gives a two-dimensional pattern depending on the two-dimensional information, for example, like the one shown in FIG. 2A, to the incident object beam, the pattern comprising on pixels (shown by white boxes in FIG. 2A) and off pixels. This beam is made incident on the holographic recording medium 12 and then interferes with the reference beam, whereby a two-dimensional information page 40A comprising many pixels (8×8=64 pixels in FIG. 2A) is holographically recorded.

Figure 3:
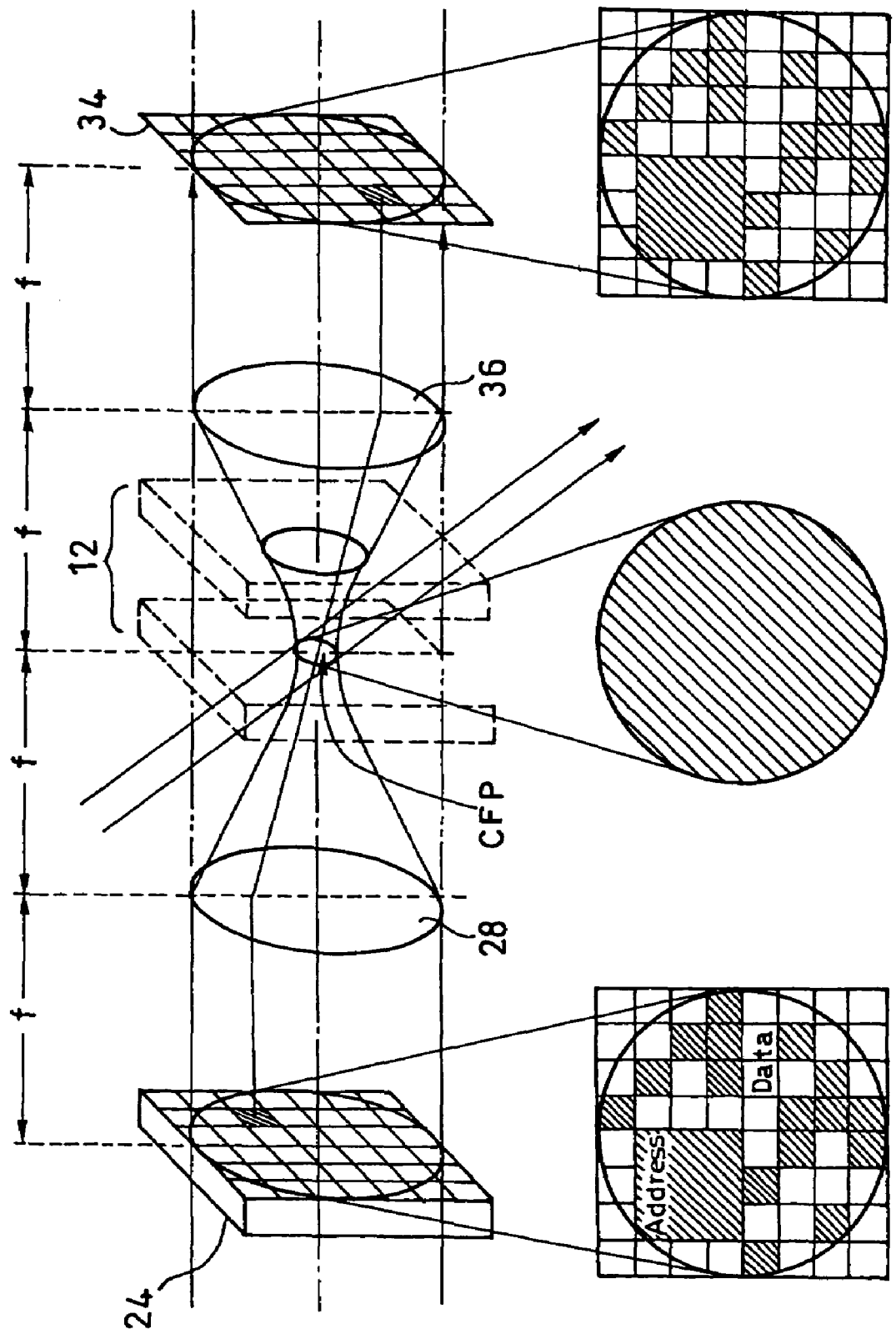
FIG. 3 is a schematic diagram illustrating both an arrangement of optical elements and recording and reproduced patterns in the holographic recording and reproducing apparatus.

More in detail, as shown in FIG. 3, the two Fourier lenses 28 and 36 have a confocal point (CFP), and the SLM 24, the Fourier lens 28, the confocal point CFP, the Fourier lens 36, and the CCD 34 form a so-called 4f optical system in which they are disposed at an interval equal to the focal length f of the Fourier lenses 28 and 36. With this structure, a pattern (two-dimensional information) formed on the SLM 24 is transmitted by the object beam, Fourier-transformed completely at the confocal point CFP, and imaged on the CCD 34 after having passed through the second Fourier lens 36, whereby the original image is reconstructed. Although, in principle, the holographic recording medium 12 can be placed at any position on the optical path of the object beam, however, in the embodiment, it is placed at the position of the confocal point CFP so as to form a so-called Fourier hologram.

Patterns (two-dimensional information) imaged on the SLM 24 and the CCD 34 are information that is separated and displayed on a pixel basis, whereas, in the recording region within the holographic recording medium 12, the two-dimensional information cannot be separated on a pixel basis because it is recorded as multiplexed interference patterns.

The above-described on and off pixels and an on-pixel ratio (to be described later) will now be described.

The SLM 24 can allow incident light to exit to a predetermined optical path and also can control the exit on a pixel basis, wherein a state of the pixel through which incident light can exit is called "on state", and another state of the pixel through which the incident light cannot exit because it is absorbed or is reflected or scattered toward, and then the incident light cannot be he outside of the predetermined optical path is called "off state".

A pixel in the on state is referred as "on pixel," and a pixel in the off state as "off pixel." The SLM 24 like the one described above typically comprises several hundred thousands to millions of pixels capable of switching on and off, wherein the ratio of the number of on pixels to the number of total pixels is defined as "on-pixel ratio."

Further, given a pixel group comprising part of the total pixels in the SLM 24, the ratio of the number of on pixels in the pixel group to the number of total pixels included in the pixel group is defined as the on-pixel ratio of the pixel group.

The two-dimensional information page 40A shown in FIG. 2A has an address information region 42A comprising 16 address pixels, formed on the upper left side of the page, and, as shown in FIGS. 2B to 2D, address information regions 42B to 42D in the other pages are formed at different positions in the respective two-dimensional information pages 40B to 40D. In the two-dimensional information pages 40A to 40D, all other pixels except the address information regions 42A to 42D are selected as data pixels and used as data regions 44A to 44D in which two-dimensional information is described.

The address information regions 42A to 42D and data regions 44A to 44D are different in their on-pixel ratios so as to be distinguished from each other by a light detector, a CCD, or other device. Typically, for example, the on-pixel ratios of the data regions 44A to 44D are set to 50% to perform differential encoding, whereas those of the address information regions 42A to 42D are set to less than or more than 50%.

In this case, since each of the address information regions 42A to 42D includes 16 address pixels, when any or all part of these pixels are selected as on or off pixels, as long as the numbers of the on and off pixels are not made equal, the on-pixel ratio becomes less than or more than 50%.

In this embodiment, the on-pixel ratio is set to 100%, that is, all 16 address pixels are selected as on pixels.

As shown in FIG. 2B to 2D, each of the address information regions 42B to 42D is formed such that its position shifts by one pixel in the diagonally lower right direction of the two-dimensional information page. That is, the address information region 42 is formed at a different position in each of the two-dimensional information pages.

Figure 4:
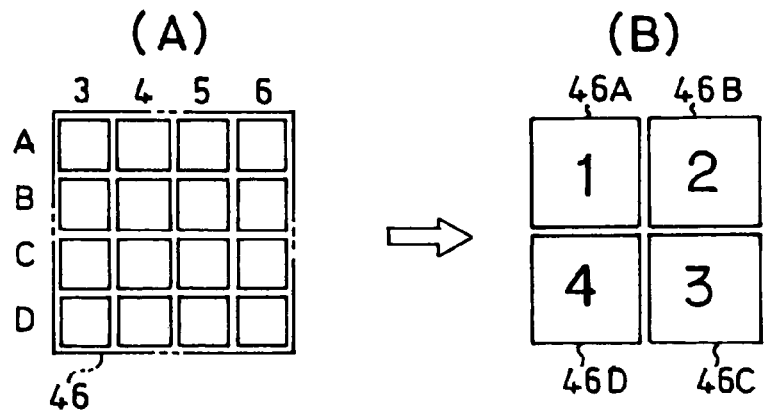
FIG. 4 is a schematic diagram illustrating a relationship between a detection region and virtual sensor regions when a two-dimensional page is searched in the holographic recording and reproducing apparatus.
Figure 5:
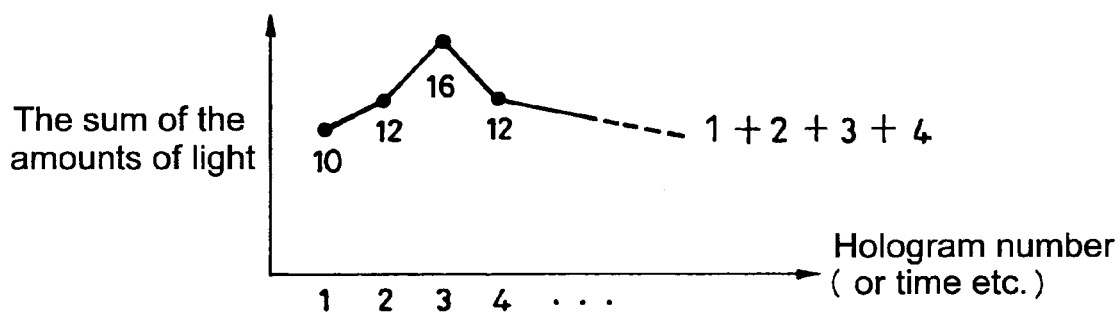
FIG. 5 is a diagram illustrating the sum of the amounts of light detected at the virtual sensor regions.

The CCD 34 reproduces a two-dimensional information page by its pixels, but is configured, for example, so as to monitor only 16 pixels forming a detection region 46 shown by a chain double-dashed line in FIG. 4(A). In this case, as shown in FIG. 4(B), the 16 pixels are divided into four equal blocks 1 to 4 forming respective virtual sensor regions 46A to 46D. The control unit 38 calculates the sum of the light amounts detected in the virtual sensor regions 46A to 46D, i.e., 1 (=A3+A4+B3+B4)+2(=A5+A6+B5+B6)+3(=C3+C4+D3+D4)+4(=C5+C6+D5+D6), in the order of the hologram number or in the order of time as shown in FIG. 5, and addressing is thought to be accomplished when the maximum value is obtained in the summations.

In FIG. 4(A), the characters A, B, C, D, and 3, 4, 5, 6 denote the pixel address numbers in a two-dimensional information page, and the characters A3, A4, . . . D5, and D6 denote the optical outputs of the pixels corresponding to these addresses.

Next, a process will be described that any of the two-dimensional pages holographically recorded in the holographic medium 12 is addressed in the above holographic recording and reproducing apparatus 10.

During addressing, the object optical system 20 is controlled so as to block the laser beam by using the spatial light modulator 24. Next, the reference optical system 22 irradiates the reference beam to the holographic recording medium 12, whereby diffraction light is produced according to the pattern recorded in a two-dimensional information page and input to the CCD 34 via the Fourier lens 36. The CCD 34 reproduces the two-dimensional information page.

When the reference beam from the reference optical system 22 sequentially reconstructs the holograms multiplexed by, for example, changing the incident angle of a reference beam (angle multiplexing), shifting the holographic recording medium 12 (shift multiplexing), or changing the phase modulation pattern of a reference beam (phase multiplexing), the multiple reconstructed holographic images appear sequentially on the CCD 34.

When the two-dimensional information page 40C (hologram No. 3) shown in FIG. 2C is intended to be addressed, for example, since its address information region corresponds to a square region (16 pixels) having the orthogonally disposed pixels C3 to F6, the CCD 34 is set so as to monitor only the central 16 pixels as described above.

The reconstructed holographic images thus appear on the CCD 34 one by one, and the sum of the light amounts of the monitoring 16 pixels shows the maximum value only when the hologram No. 3 is reconstructed (when a value given on the vertical axis in FIG. 5 is 16), whereby the hologram No. 3 can be addressed.

Figure 6:
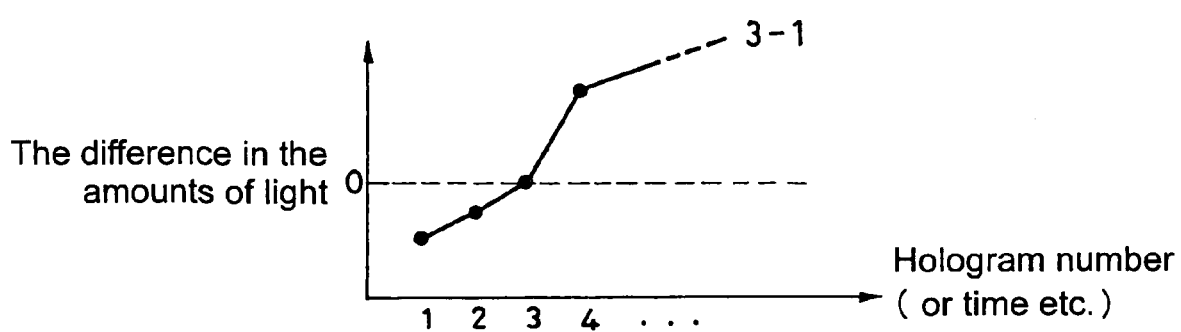
FIG. 6 is a diagram illustrating the difference in the amounts of light detected.

Further, in the holographic recording and reproducing apparatus 10 according to the first exemplary embodiment, as shown in FIG. 6, when the control unit 38 calculates the light amount differences between the blocks 1 and 3, the point at which the calculation result becomes zero (when crossing the horizontal axis from negative to positive) gives the target address. Combining a plurality of different calculation processes can perform more accurate address detection.

Next, another addressing method will be described.

Figure 7:
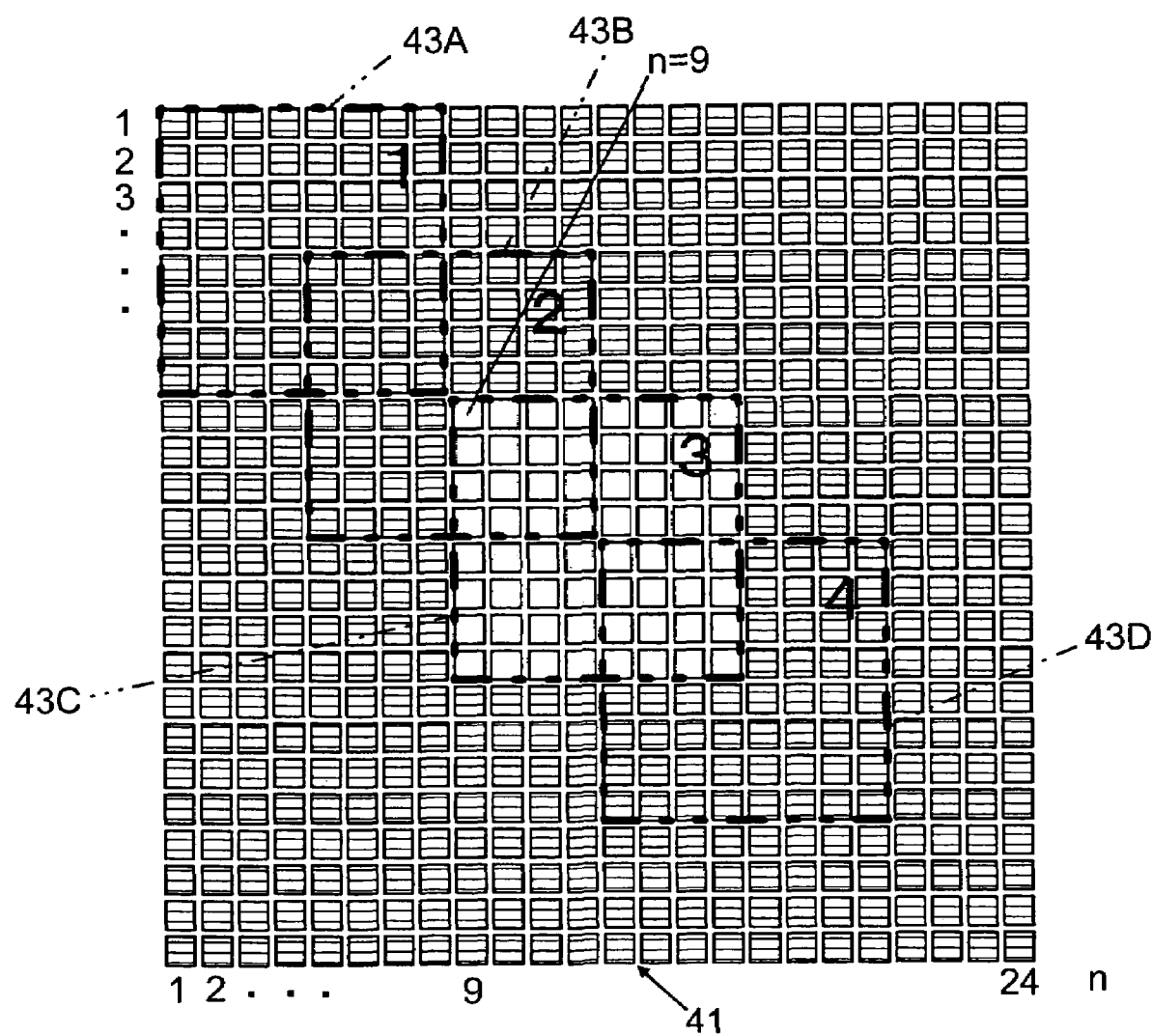
FIG. 7 is a schematic diagram illustrating another method of addressing in the holographic recording and reproducing apparatus.

As shown in FIG. 7, in this addressing method, the address information region is set to be, e.g., 8×8=64 pixels in size, and while shifting by four pixels from the upper left to lower right in each two-dimensional information page 41, each hologram is assigned. In FIG. 7, the reference characters 43A to 43D denote the address information regions in the respective hologram Nos. 1 to 4.

The CCD 34 monitors the sum of the light amounts of all 64 pixels in each of the address information regions 43A to 43D while scanning the detected reconstructed image (whole 24×24=576 pixels shown in FIG. 7) from the upper left to lower right. In this case, if the data regions other than the address information regions 43A to 43D in the respective hologram Nos. 1 to 4 are assumed to have an on-pixel ratio of 50%, a relationship between the sum of the light amounts of the 64 pixels and the scanning place becomes like the one shown in FIG. 8.

Figure 8:
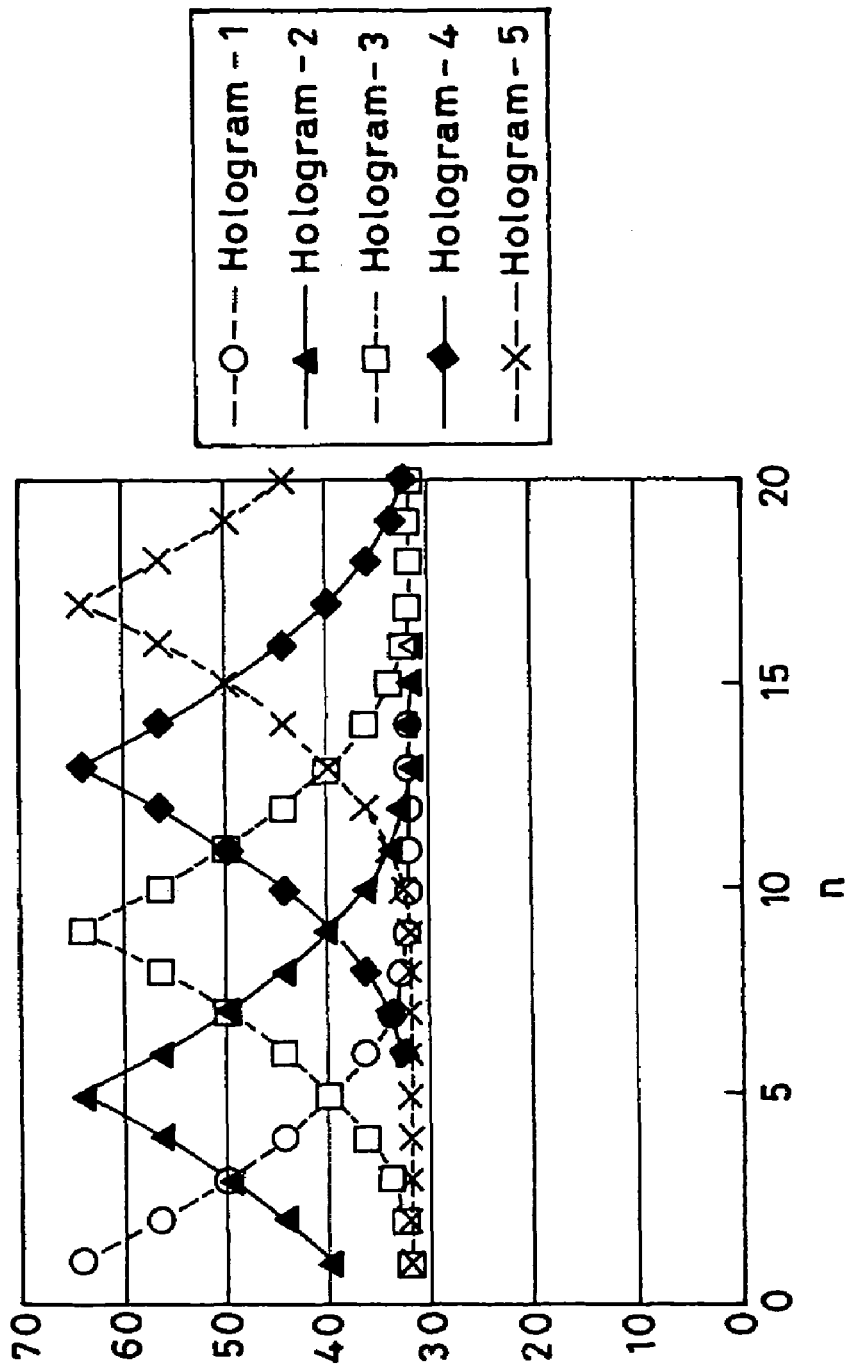
FIG. 8 is a diagram illustrating a relationship between a position of the address information region in a two-dimensional information page and the amount of light detected at the virtual sensor regions.

In FIG. 8, the character n indicates the head pixel number disposed at the upper left corner of monitoring 64 pixels. It is appreciated from FIG. 8 that the graphs describing the hologram Nos. 1 to 5 show sharp peaks at the respective numbers n=1, 5, 9, 13, 17, enabling each address to be detected.

Similarly, any hologram numbers can be detected, and it is also possible to know the address of the two-dimensional information page from a given reconstructed image.

Figure 9:
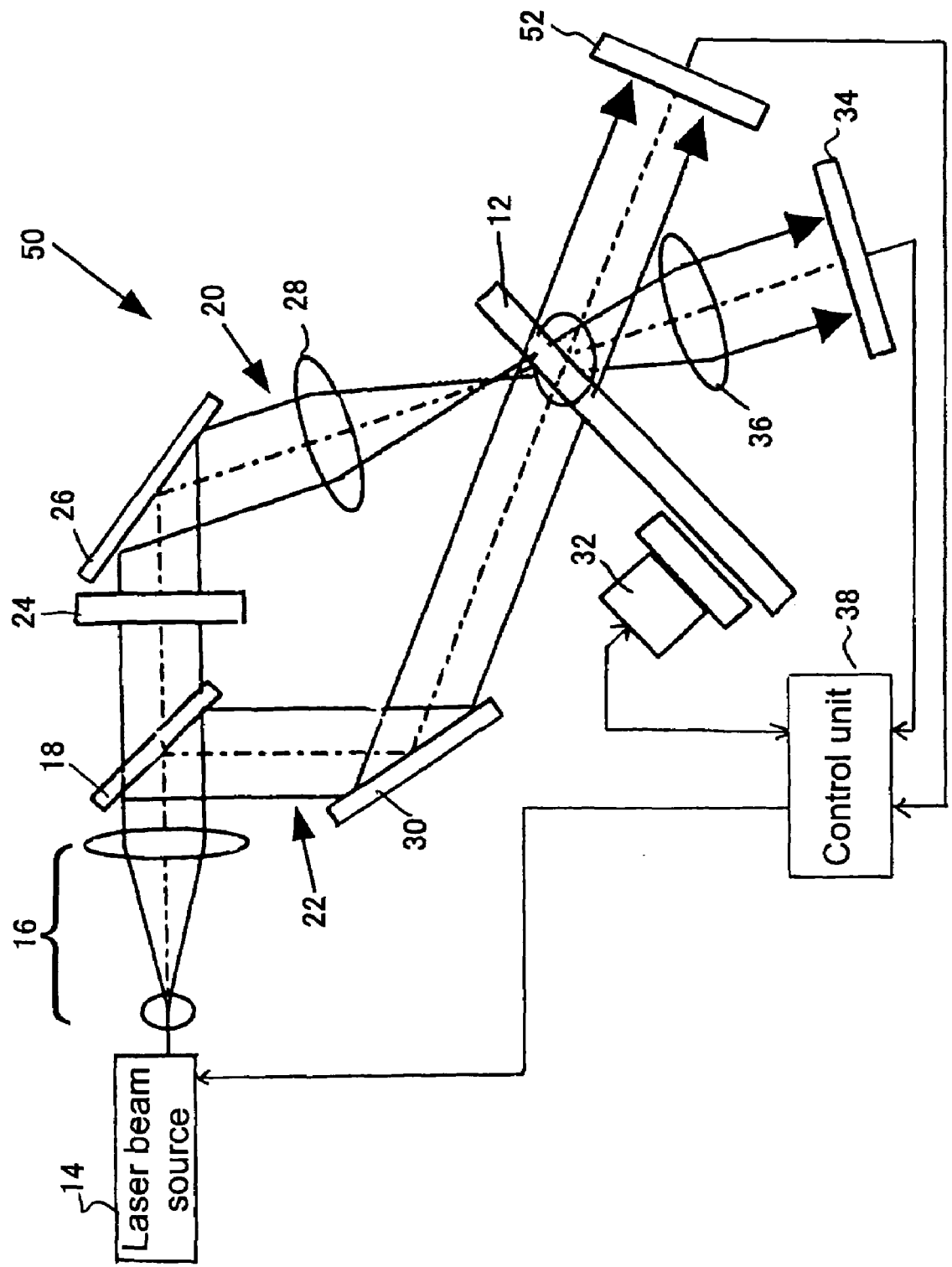
FIG. 9 is an optical system diagram including part of a block diagram, illustrating a holographic recording and reproducing apparatus according to a second exemplary embodiment of the invention.
Figure 10:
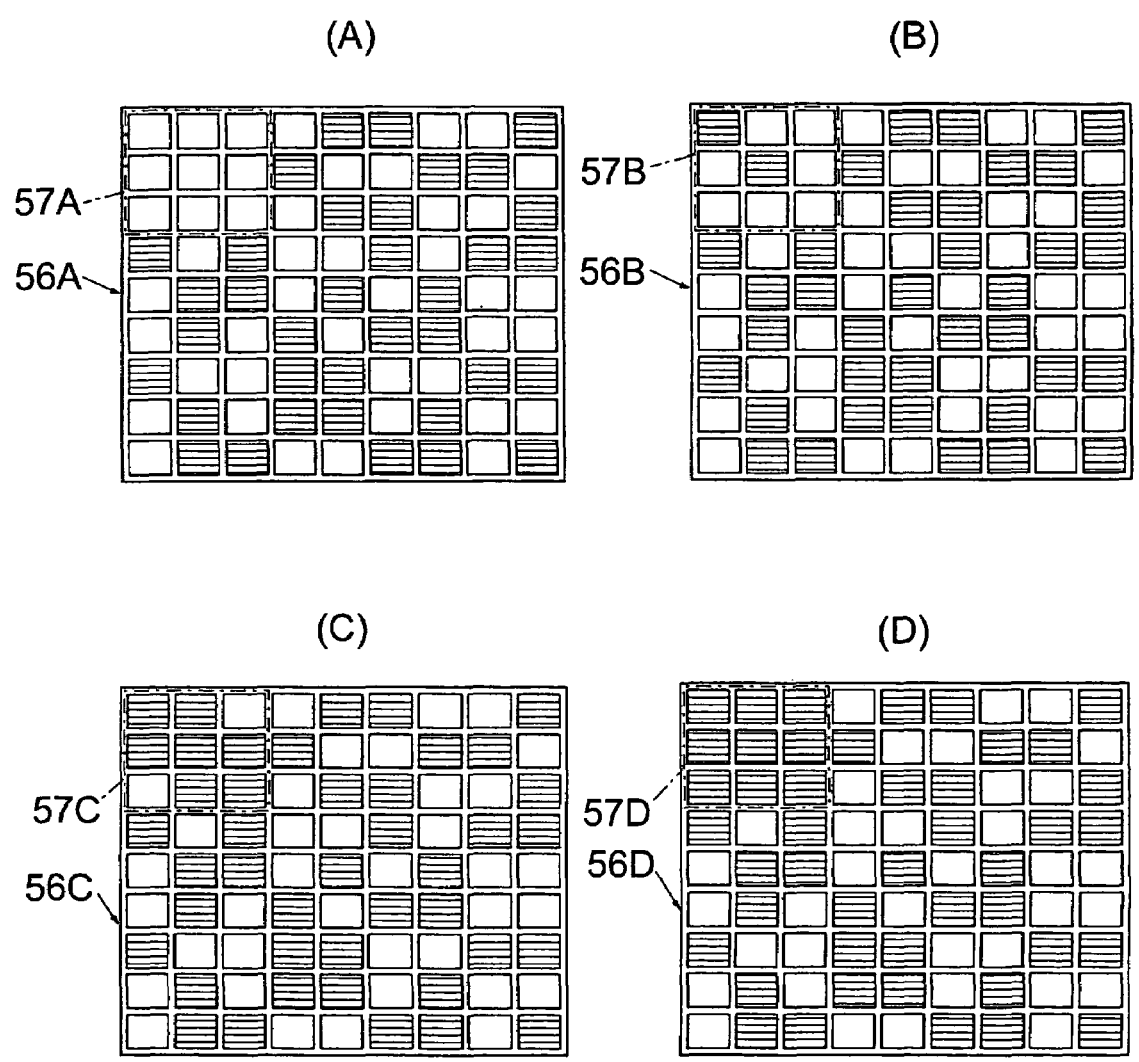
FIG. 10 is maps illustrating a first two-dimensional information page group recorded and reproduced in the holographic recording medium of the holographic recording and reproducing apparatus in FIG. 9.
Figure 11:
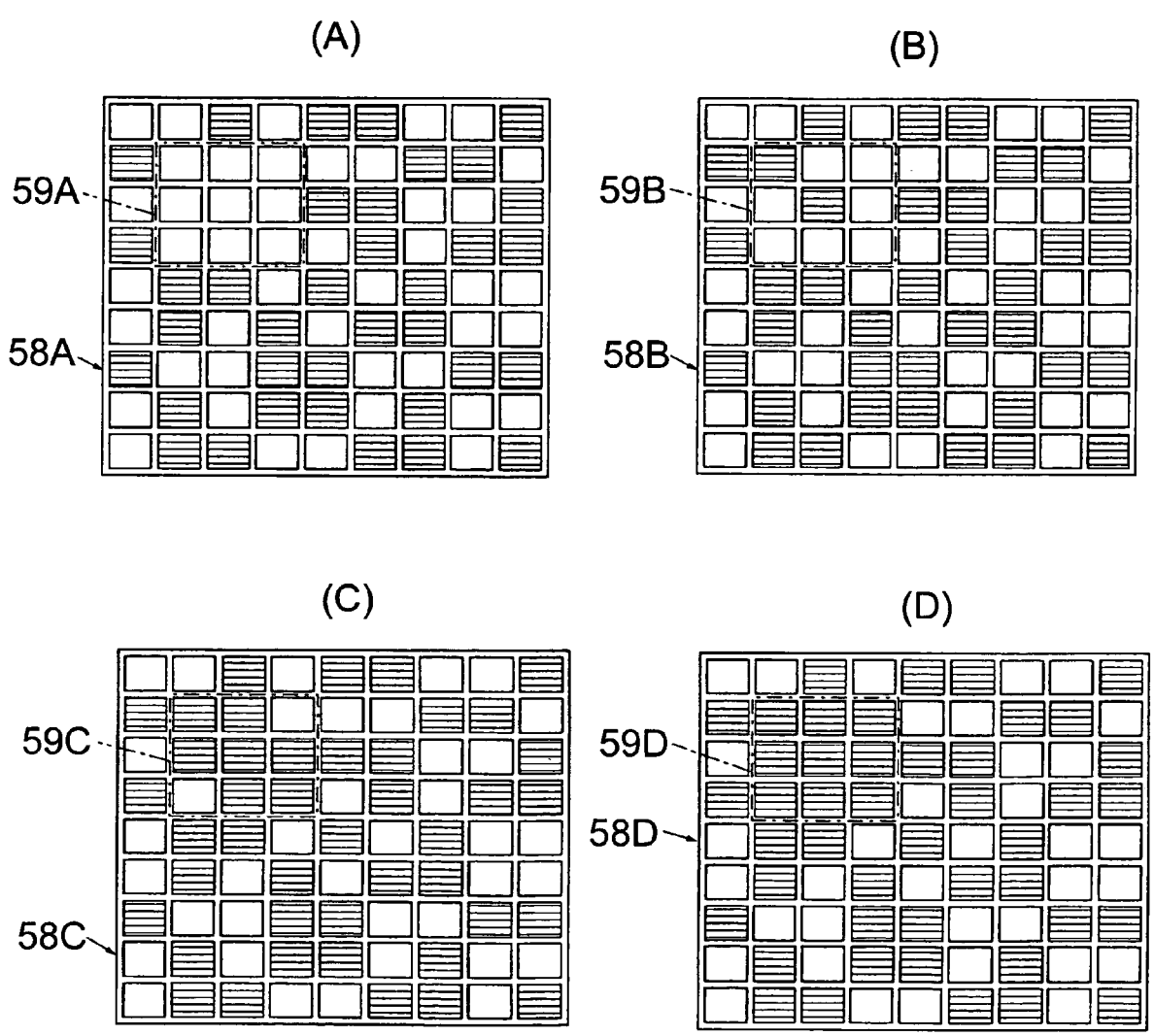
FIG. 11 is maps illustrating a second two-dimensional information page group.
Figure 12:
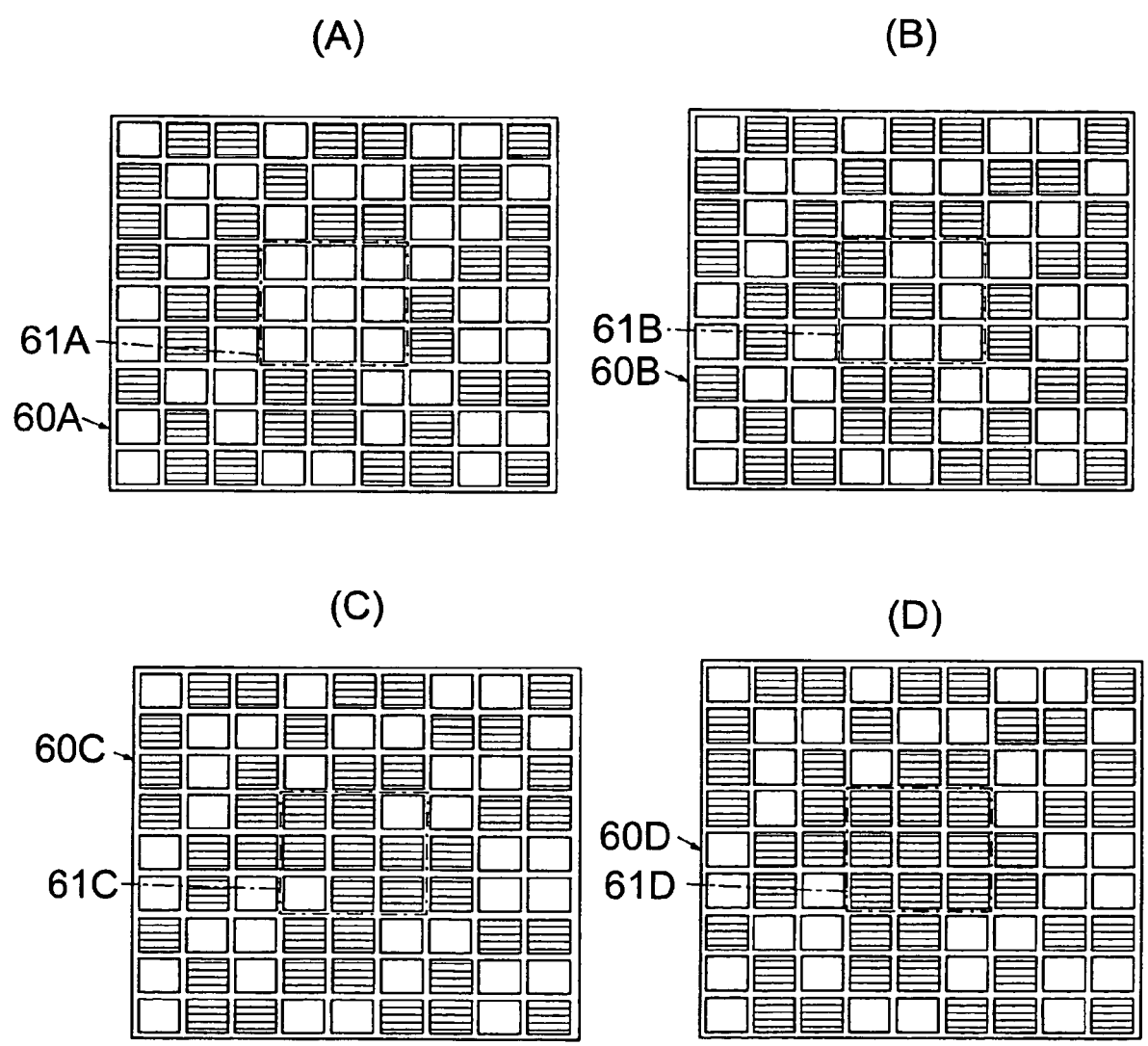
FIG. 12 is maps illustrating a third two-dimensional information page group.
Figure 13:
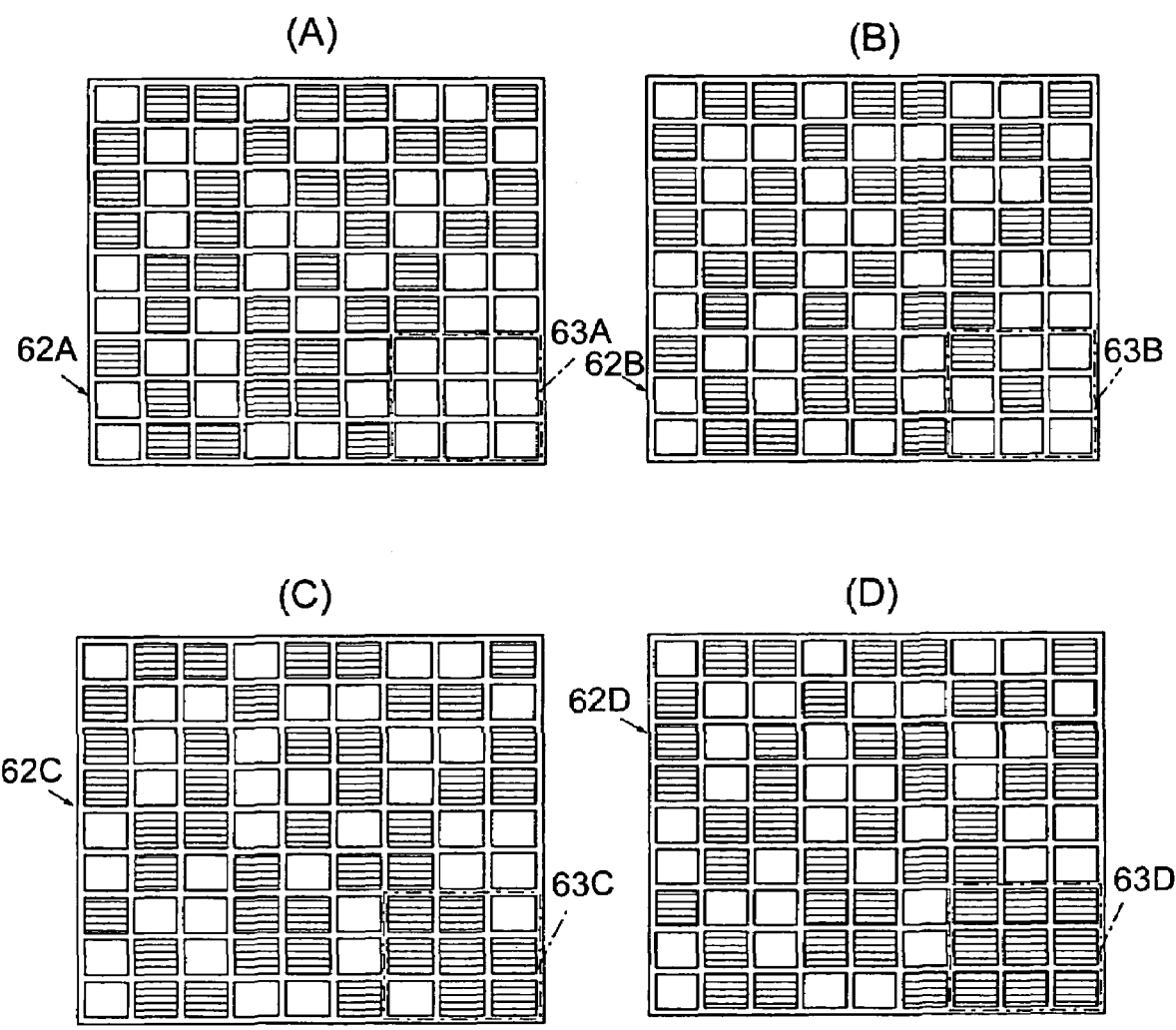
FIG. 13 is maps illustrating a fourth two-dimensional information page group.

The holographic recording and reproducing apparatus 50 of a second exemplary embodiment of the invention shown in FIG. 9 will now be described.

This holographic recording and reproducing apparatus 50 differs from the holographic recording and reproducing apparatus 10 in FIG. 1 in that: a light detector 52 comprising photodiodes that receive the diffraction light of the information beam is provided; and a plurality of two-dimensional information pages having address information regions disposed at an identical position are defined as an identical two-dimensional information page group, and the address information regions of the identical two-dimensional information group have on pixels differently arranged on a two-dimensional information page basis. The other structures are the same as those in FIG. 1, so their repeated descriptions will be omitted by employing like reference characters for like elements.

In this embodiment, as shown in FIGS. 10(A) to 10(D), 11(A) to 11(D), 12(A) to 12(D), and 13(A) to 13(D), every two-dimensional information page has a total number of 9×9=81 pixels including an address information region comprising 3×3=9 pixels.

In a first two-dimensional information page group 56, as shown in FIGS. 10(A) to 10(D), two-dimensional information pages 56A to 56D have respective address information regions 57A to 57D, each having 9 address pixels and disposed at the upper left corner in the drawing.

In a second two-dimensional information page group 58, as shown in FIGS. 11(A) to 11(D), two-dimensional information pages 58A to 58D have respective address information regions 59A to 59D, each being shifted orthogonally in the lower right direction in the drawing by one pixel in both the X and Y directions, with respect to the address information regions 57A to 57D in the first two-dimensional information page group 56.

A third two-dimensional information page group 60 shown in FIGS. 12(A) to 12(D) comprises two-dimensional information pages 60A to 60D, in which their address information regions 61A to 61D are each disposed at the position shifted further by two pixels diagonally in the lower right direction with respect to the address information regions 59A to 59D.

A fourth two-dimensional information page group 62 shown in FIGS. 13(A) to 13(D) comprises two-dimensional information pages 62A to 62D, in which their address information regions 63A to 63D are each disposed at the position shifted further by three pixels diagonally in the lower right direction with respect to the address information regions 61A to 61D (disposed at the lower right corner).

The address information regions 57A, 59A, 61A, and 63A are each set such that all the nine address pixels in each of the regions are on pixels (an on-pixel ratio of 100%).

The address information regions 57B, 59B, 61B, and 63B are each set such that seven pixels among the nine address pixels are on pixels (an on-pixel ratio of 7/9=78%).

The address information regions 57C, 59C, 61C, and 63C are each set such that two pixels among the nine address pixels are on pixels (an on-pixel ratio of 2/9=22%).

The address information regions 57D, 59D, 61D, and 63D are each set to an on-pixel ratio of 0/9=0%.

A process for searching a two-dimensional information page at high speed in the holographic recording and reproducing apparatus 50 according to this exemplary embodiment will now be described.

First, in a two-dimensional information page group to which a target two-dimensional information page belongs, for example, in the third two-dimensional information page group 60, only the pixels disposed in the address information regions 61A to 61D are set to be on pixels, whereby the SLM 24 modulates (narrows down) the object beam to generate a search beam.

The search beam is then diffracted at the position of the holographic recording medium 12 and input to the light detector 52.

Figure 14:
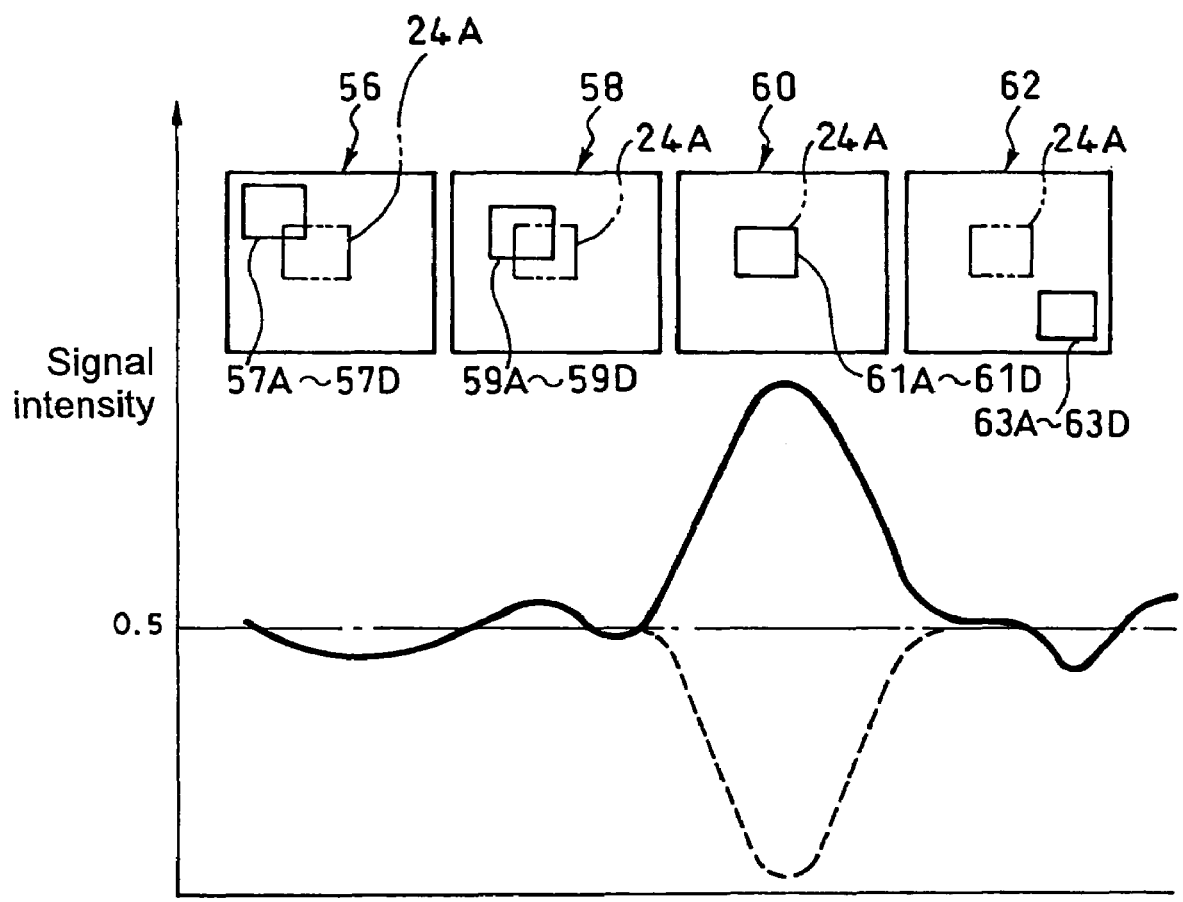
FIG. 14 is maps illustrating the light modulation states in a SLM when a two-dimensional page group is searched in the holographic recording and reproducing apparatus.

On the reconstructed images, the positions of the address information regions differ from one another on a two-dimensional information page group basis, so that, as shown in FIG. 14, only the reproduced third two-dimensional information page group 60 allows the on pixel region at the SLM 24 to overlap with each of the address information regions 61A to 61D. In this case, the output of the light detector 52 shows an on-pixel ratio of either 100%, 78%, 22%, or 0%. In the case of 100% or 78%, for example, an upward peak appears as shown by a solid line in FIG. 14, whereas, in the case of 22% or 0%, a trough shape appears as shown by a broken line. In either case, the numerical value of the output becomes less than or more than 50%.

Accordingly, when the output of the light detector 52 detecting the region illuminated by the search beam does not show a value of 50%, it is found that the target two-dimensional information page belongs to the third two-dimensional information page group 60.

In this exemplary embodiment, a target two-dimensional information page group may also be searched in the same way as in FIGS. 7 and 8; the pixels corresponding to the address information region in the reconstructed image on the CCD 34 are scanned, for example, from the upper left to lower right direction.

Next, the target two-dimensional information page is searched from the third two-dimensional information page group 60. This is carried out by searching the on-pixel ratios of the address information regions 61A to 61D in the two-dimensional information pages 60A to 60D included in the searched third two-dimensional information page group 60.

That is, if the target page is the two-dimensional information page 60C, since its address information region 61C has an on-pixel ratio of 22%, the two-dimensional information page having an on-pixel ratio of 22% may be searched from the output of the light detector 52.

Since the address information region comprises nine address pixels, the on-pixel ratio can be set to ten steps, any one of which does not become 50% because nine is odd number. Therefore, the light detector 52 may be any type of detector that can detect an input signal over the ten steps, and conventional detectors can be sufficiently used. This multiple step setting of the on-pixel ratio is regarded as one aspect of the on-pixel arrangement (described later).

In the above exemplary embodiment, each of the two-dimensional information pages has 9×9=81 pixels and the address information region comprises 3×3=9 address pixels, but the invention is not limited to these numbers. The numbers of total pixels and address pixels may be increased or decreased according to the number of two-dimensional information pages to be recorded.

When the number of data pixels obtained by subtracting the number of address pixels from that of total pixels is odd, an operation is performed that takes away a single pixel from the data pixels to make the on-pixel ratio 50%.

The number of addresses that can be described when addressing operation is performed only by detecting the total amount of light from the address information region will now be described.

Figure 15:
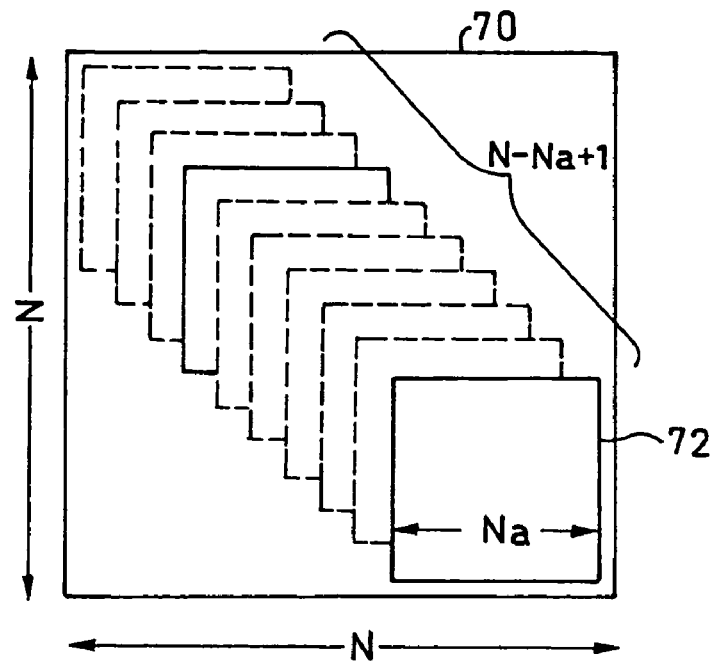
FIG. 15 is a schematic diagram for describing a calculation of the total number of addresses when the searching method in FIG. 14 is used.

As shown in FIG. 15, if it is assumed that a two-dimensional information page 70 has N×N pixels and includes an address information region 72 comprising Na×Na pixels, the address information region 72 can take $(N-Na+1)$ positional combinations within the two-dimensional information page 70.

Since the number of on pixels within the address information region 72 can take all integer values between 0 to $Na^2$, $(Na^{2+1})$ gradational combinations can be expressed. When the number of pixels within the address information region 72 is even, however, the on-pixel ratio can take 50%, which is equal to the on-pixel ratio of the data region, so this case should be excluded.

Accordingly, the number of gradation expression patterns in the address information region is given by the following equation (1).

$Na^2+a$ (where, $a=1$ when $Na$ is odd, and $a=0$ when $Na$ is even)   (1)

When an addressing operation is performed only by detecting the total amount of light from the address information region, the total number of addresses is thus described by the following:

$(N-Na+1) \times (Na^2+a)$   (2)

Further, the total number of addresses for a two-dimensional information page group is given by $(N-Na+1)$.

Figure 16:
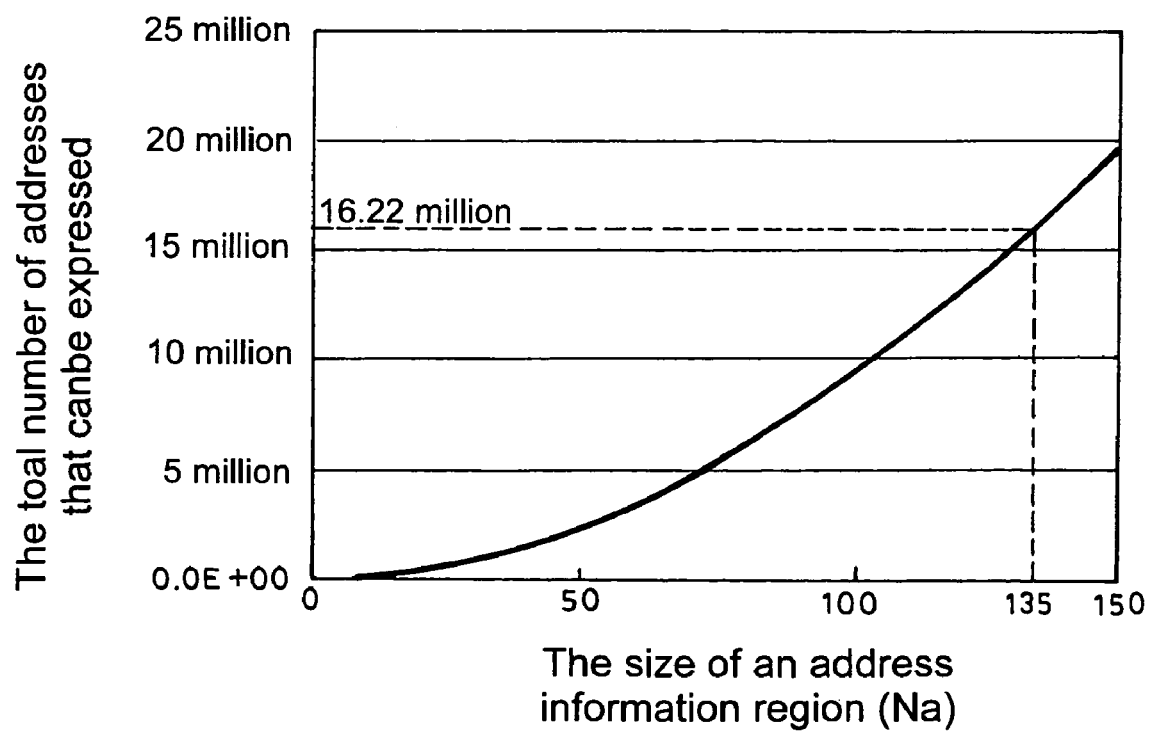
FIG. 16 is a diagram illustrating a relationship between the total number of addresses and the size (number of pixels) of the address information region.

FIG. 16 illustrates the total number of addresses vs. Na. When the SLM has a capacity of 1 Mpixels, to obtain a total number of 16 million addresses, the address information region needs to have Na×Na=135×135 pixels, which occupies 1.7% of the total area of the two-dimensional information page.

In the above exemplary embodiment, each two-dimensional information page in a two-dimensional information group is identified by the on-pixel ratio of the address pixels included in the address information region, but the invention is not limited to this method. The two-dimensional information pages may be identified also by the on-pixel ratio and/or on-pixel arrangement (on-pixel pattern).

Figure 17:
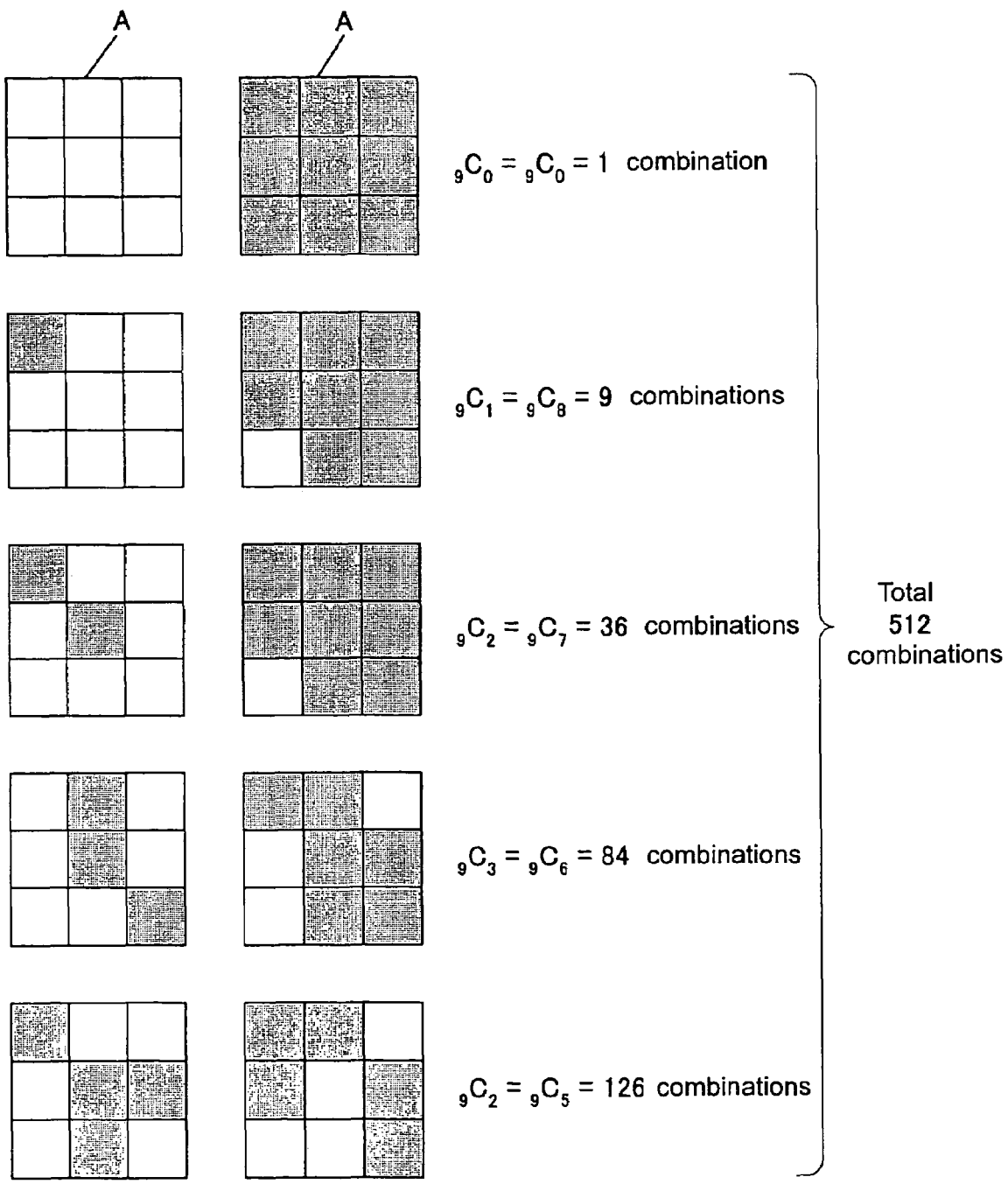
FIG. 17 is diagrams illustrating the combinations of on-pixel arrangements in an address information region in the holographic recording medium.

In this case, as shown in FIG. 17, the on-pixel patterns generated by the nine address pixels included in the address information region A can describe 512 address combinations.

As shown in table 1, if the total number of address pixels included in the address information region is denoted A (=$Na^2$), the number of patterns that can be expressed is given by $_AC_B$ and calculated to be 53771986 patterns when A=16 and 34225520640 patterns when A=25.

TABLE 1

| | Na | | |
|---|---|---|---|
| | 5 | 4 | 3 |
| | | A = $Na^2$ | |
| B | 25 $_AC_B$ | 16 $_AC_B$ | 9 $_AC_B$ |
| 0 | 1 | 1 | 1 |
| 1 | 25 | 16 | 9 |
| 2 | 300 | 120 | 36 |
| 3 | 2300 | 560 | 84 |
| 4 | 12650 | 1820 | 126 |
| 5 | 53130 | 4368 | 126 |
| 6 | 177100 | 8008 | 84 |
| 7 | 480700 | 11440 | 36 |
| 8 | 1081575 | | 9 |
| 9 | 2042975 | 11440 | 1 |
| 10 | 3268760 | 8008 | |
| 11 | 4457400 | 4368 | |
| 12 | 5200300 | 1820 | |
| 13 | 5200300 | 560 | |
| 14 | 4457400 | 120 | |
| 15 | 3268760 | 16 | |
| 16 | 2042975 | 1 | |
| 17 | 1081575 | | |
| 18 | 480700 | | |
| 19 | 177100 | | |
| 20 | 53130 | | |
| 21 | 12650 | | |
| 22 | 2300 | | |
| 23 | 300 | | |
| 24 | 25 | | |
| 25 | 1 | | |
| $\Sigma_A C_B$ | 33554432 | 52666 | 512 |
| (N—Na + 1) | 1020 | 1021 | 1022 |
| Total number of addresses | 34225520640 | 53771986 | 523264 |

Currently available SLMs have a capacity of about 1 Mpixels (N=1024). To obtain a recording medium with, for example, 1 terabyte (TB), it is necessary to record at least 8 millions or preferably 16 millions of holograms. If the total number of pixels included in a two-dimensional information page is N×N, the number of addresses (the number of on-pixel patterns) is given by N−Na+1. As shown in table 1, if an address information region includes $A=Na^{2=4\times4=16}$ pixels, the number of addresses given by $\Sigma_A C_B \times (N-Na+1)$ is calculated to be about 53.77 millions, which is sufficient for the 1 TB recording medium. In this case, the number of addresses obtained when A=16 and B=8 are excluded because the on-pixel ratio becomes 50%.

This exemplary embodiment can achieve a high speed access in such a way that: first, the amount of light from an address information region is detected by the light detector 52; only the holograms are extracted that have the address information regions with an on-pixel ratio of less than or more than 50%, disposed at a specific position in the two-dimensional information pages; and then the on-pixel pattern of each address information region is detected.

Comparing with the first exemplary embodiment described above, the present exemplary embodiment must identify the pixel arrangements in the address information regions, so that it has a disadvantage over the first exemplary embodiment in increasing the addressing speed. Nevertheless, the present exemplary embodiment can still improve the addressing speed in comparison with recording media such as optical discs that record all address information as digital data.

In the present exemplary embodiment, the minimum address information region necessary to express a total number of 16 million addresses or more is set to 16 pixels, but the address information region having a number of more than 16 pixels may also be used.

For example, using an address information region having Na=5, that is, 5×5=25 pixels, only the pixel patterns obtained when B=3, 6, 9, 12, 15, 18, and 21 can be used. In this case, if the number of pixel patterns that can be expressed is matched to the minimum number of pixel patterns obtained when B=3 and the resulting 2300 pixel arrangements are used for each of the cases of the above B (3, . . . , 21), the total number of addresses that can be expressed comes to 2300×7×1020=16,422,000 combinations, exceeding 16 million addresses.

The detection can thereby be more roughly performed than the detection with $Na^2+1=17$ gradations using 16 pixels. In addition, when assigning the addresses to a whole recording medium, the recording medium can be sectioned using a group of 2300 addresses as a unit, so that, for example, the idea like a sector, so-called in optical discs, can be employed.

INDUSTRIAL APPLICABILITY

With the above configuration, the present invention has an excellent effect in that address information can be placed in two-dimensional information pages so as to be detected by a simple addressing operation and the two-dimensional information pages can be easily identified.

The invention claimed is:

1. A holographic recording medium in which two-dimensional information pages each having multiple pixels are multiplexed and holographically recorded, wherein:
    address pixel and data pixel signals are recorded in each of the two-dimensional information pages;
    a plurality of pixels in the two-dimensional information page form the address pixels, and a set of the address pixels forms an address information region, the address information region being an integral region;
    a position at which a first address information region is disposed on a first two-dimensional information page is different from a position at which a second address information region is disposed on a second two-dimensional information page; and
    the pixels outside the address information region disposed in the two-dimensional information page form a data region in which two-dimensional information is recorded as the data pixels.

2. The holographic recording medium according to claim 1, wherein
    the set of the address pixels and a set of pixels similar to the set of the address pixels in the data region differ from each other in at least either on-pixel ratio or on-pixel arrangement.

3. The holographic recording medium according to claim 2, wherein the address information region differs from the data region in on-pixel ratio.

4. The holographic recording medium according to claim 3, wherein the on-pixel ratio of the data region is set to 50%, and the on-pixel ratio of the address information region is set to less than or more than 50%.

5. The holographic recording medium according to claim 4, wherein
    the address information region comprises a pixel block including a set of at least nine address pixels, and all the address pixels in the pixel block are set to on or off state.

6. The holographic recording medium according to claim 3, wherein
    the address information region comprises a pixel block including a set of at least nine address pixels, and all the address pixels in the pixel block are set to on or off state.

7. A method for adding address information to a holographic recording medium capable of recording by interference between reference and information beams, wherein,
    when recording two-dimensional information pages each comprising multiple pixels into the holographic recording medium, an address information region comprising a set of address pixels formed by a plurality of pixels is formed as an integral region, a position at which a first address information region is disposed on a first two-dimensional information page is different from a position at which a second address information region is disposed on a second two-dimensional information page, and two-dimensional information is given to a data region comprising pixels outside the address information region disposed in the two-dimensional information page to perform holographic recording.

8. The method for adding address information to a holographic recording medium according to claim 7, wherein
    address information is holographically recorded such that the set of address pixels and a set of pixels similar to the set of address pixels in the data region differ from each other in at least either on-pixel ratio or on-pixel arrangement.

9. The method for adding address information to a holographic recording medium according to claim 8, wherein
    the on-pixel ratio of the data region is set to 50%, and the on-pixel ratio of the address information region is set to less than or more than 50%.

10. The method for adding address information to a holographic recording medium according to claim 8, wherein
    the address information region comprises address pixels, and all the address pixels are set as on or off pixels.

11. The method for adding address information to a holographic recording medium according to claim 9, wherein
    the address information region comprises address pixels, and all the address pixels are set as on or off pixels.

12. The method for adding address information to a holographic recording medium according to claim 7, wherein
    the address pixel and the data pixel forming each of the two-dimensional information pages are displayed by pixels in a spatial light modulator disposed on an optical path of the information beam.

13. A method for addressing a holographic recording medium in which: two-dimensional information pages each comprising multiple pixels are multiplexed and holographically recorded by using interference between reference and information beams; an address information region comprising a set of address pixels formed by a plurality of pixels selected from among the pixels and a data region comprising the remaining pixels and capable of recording two-dimensional information are provided in each of the two-dimensional information the address pages, information region being an integral region, and a position at which a first address information region is disposed on a first two-dimensional information page is different from a position at which a second address information region is disposed on a second two-dimensional information page; wherein
    a target two-dimensional information page is detected by an amount of light from the address information region among diffraction light generated by irradiating a reference or search beam to the holographic recording medium.

14. The method for addressing a holographic recording medium according to claim 13, wherein
    the data region is recorded with an on-pixel ratio of 50%, the address information region is recoded with an on-pixel ratio of less than or more than 50%, and the address information region is detected by a difference between the amounts of the diffraction light in the data region and the address information region.

15. The method for addressing a holographic recording medium according to claim 14, wherein
    the reference or search beam is concentrated within the range of the address information region in a target two-dimensional information page, and sequentially illuminates each two-dimensional information page, thereby detecting the target two-dimensional information page by the diffraction light generated when the region illuminated by the reference or search beam matches the address information region.

16. The method for addressing a holographic recording medium according to claim 13, wherein
the reference or search beam is concentrated within the range of the address information region in a target two-dimensional information page, and sequentially illuminates each two-dimensional information page, thereby detecting the target two-dimensional information page by the diffraction light generated when the region illuminated by the reference or search beam matches the address information region.

17. The method for addressing a holographic recording medium according to claim 13, wherein
the address information regions are recorded in a form of on-pixel arrangements that differ from one another on different two-dimensional information pages, and a target two-dimensional information page is detected according to the on-pixel arrangement after the position of the address information region in the two-dimensional information page has been detected.

18. A holographic recording and reproducing apparatus for reproducing two-dimensional information in a holographic recording medium in which: two-dimensional information pages each comprising multiple pixels are multiplexed and holographically recorded; address and data pixel signals are recorded in each of the two-dimensional information pages; a plurality of pixels in the two-dimensional information page form the address pixels, and a set of the address pixels forms an address information region, the address information region being an integral region, a position at which a first address information region is disposed on a first two-dimensional information page is different from a position at which a second address information region is disposed on a second two-dimensional information page; and pixels outside the address information region disposed in the two-dimensional information page form a data region in which the two-dimensional information is recorded as the data pixels, the holographic recording and reproducing apparatus comprising:
a reference optical system for splitting a laser beam by using a beam splitter into an object beam and a reference beam and irradiating the reference beam to the holographic recording medium;
a search optical system for irradiating the object beam as a search beam to the holographic recording medium;
a spatial light modulator provided in an optical path of the search optical system and modulating the object beam to the search beam so as to sequentially illuminate each two-dimensional page;
a light detector for receiving diffraction light generated from the holographic recording medium by the illumination of the search beam; and
a control unit for detecting a target two-dimensional information page by an output of the light detector,
wherein the spatial light modulator comprises multiple pixels capable of describing the two-dimensional information page, and narrows down the object beam to a range corresponding to the pixels of the address information region to modulate to the search beam.

19. The holographic recording and reproducing apparatus according to claim 18, wherein
the address information regions in the two-dimensional information pages recorded in the holographic recording medium are recorded in a form of on-pixel ratios that differ from one another on a two-dimensional information page basis or on a two-dimensional information page basis in an identical page group, and the control unit detects the on-pixel ratio of an address information region from the output of the light detector obtained when the address information region matches the search beam region in the spatial light modulator, thereby detecting a target two-dimensional information page.

20. A holographic recording medium in which two-dimensional information pages each having multiple pixels are multiplexed and holographically recorded, wherein:
address pixel and data pixel signals are record in each of the two-dimensional information pages;
a plurality of pixels in the two-dimensional information page forms the address pixels, and a set of the address pixels forms an address information region, the address information region being an integral region, the address information region being an integral region;
each of a plurality of page group comprises a plurality of two-dimensional information pages;
a position at which a first address information region is disposed on a two-dimensional information page of a first page group is different from a position at which a second address information region is disposed on a two-dimensional information page of a second page group; and
the pixels outside the address information region disposed in the two-dimensional information page form a data region in which two-dimensional information is recorded as the data pixels.

21. The holographic recording medium according to claim 20, wherein
the address information regions are disposed at an identical position in an identical page group, and each of the address information regions in the identical page group has a different on or off pixel arrangement in each of the two-dimensional information pages.

22. The holographic recording medium according to claim 20, wherein
the address information regions are disposed at an identical position in an identical page group, and each of the address information regions in the identical page group has a different on or off pixel arrangement in each of the two-dimensional information pages.

23. A method for adding address information to a holographic recording medium capable of recording by interference between reference and information beams, wherein,
when recording two-dimensional information pages each comprising multiple pixels into the holographic recording medium, a plurality of page groups each of which comprising a plurality of two-dimensional information pages, an address information region comprising a set of address pixels formed by a plurality of pixels is formed as an integral region, a position at which a first address information region is disposed on a two-dimensional information page of a first page group is different from a position at which a second address information region is disposed on a two-dimensional information page of a second page group, and two-dimensional information is given to a data region comprising pixels outside the address information region disposed in the two-dimensional information page to perform holographic recording.

24. The method for adding address information to a holographic recording medium according to claim 23, wherein the address information regions are disposed at an identical position in an identical page group, and the address information regions in the identical page group have different on-pixel arrangements on a two-dimensional information page basis.

25. A method for addressing a holographic recording medium in which: two-dimensional information pages each comprising multiple pixels are multiplexed and holographically recorded by using interference between reference and information beams; a plurality of page groups each of which comprising a plurality of two-dimensional information pages; an address information region comprising a set of address pixels formed by a plurality of pixels selected from among the pixels and a data region comprising the remaining pixels and capable of recording two-dimensional information are provided in each of the two-dimensional information pages; the address information region being an integral region; and a position at which a first address information region is disposed on a two-dimensional information page of a first page group is different from a position at which a second address information region is disposed on a two-dimensional information page of a second page group, wherein
 a target two-dimensional information page is detected by an amount of light from the address information region among diffraction light generated by irradiating a reference or search beam to the holographic recording medium.

26. The method for addressing a holographic recording medium according to claim 25, wherein
 the address information regions are recorded in a form of on-pixel arrangements that differ from one another on a two-dimensional information page basis in an identical page group, and a target two-dimensional information page is detected according to the on-pixel arrangement after the position of the address information region in the two-dimensional information page has been detected.

27. A holographic recording and reproducing apparatus for reproducing two-dimensional information in a holographic recording medium in which:
 two-dimensional information pages each comprising multiple pixels are multiplexed and holographically recorded;
 address and data pixel signals are recorded in each of the two-dimensional information pages;
 a plurality of pixels in the two-dimensional information page form the address pixels, and a set of the address pixels forms an address information region, the address information region being an integral region;
 a plurality of page groups each of which comprising a plurality of two-dimensional information pages;
 a position at which a first address information region is disposed on a two-dimensional information page of a first page group is different from a position at which a second address information region is disposed on a two-dimensional information page of a second page group; and
 pixels outside the address information region disposed in the two-dimensional information page form a data region in which the two-dimensional information is recorded as the data pixels,
 the holographic recording and reproducing apparatus comprising:
 a reference optical system for splitting a laser beam by using a beam splitter into an object beam and a reference beam and irradiating the reference beam to the holographic recording medium;
 a search optical system for irradiating the object beam as a search beam to the holographic recording medium;
 a spatial light modulator provide in an optical path of the search optical system and modulating the object beam to the search beam so as to sequentially illuminate each two-dimensional page;
 a light detector for receiving diffraction light generated from the holographic recording medium by the illumination of the search beam; and
 a control unit for detecting a target two-dimensional information page by an output of the light detector,
 wherein the spatial light modulator comprises multiple pixels capable of describing the two-dimensional information page, and narrows down the object beam to a range corresponding to the pixels of the address information region to modulate to the search beam.

* * * * *